US011354055B2

(12) United States Patent
Yang (10) Patent No.: US 11,354,055 B2
(45) Date of Patent: **\*Jun. 7, 2022**

(54) METHOD AND DEVICE FOR DIVIDING STORAGE DEVICES INTO DEVICE GROUPS

(71) Applicant: Advanced New Technologies Co., Ltd., Grand Cayman (KY)

(72) Inventor: Xinying Yang, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 17/408,610

(22) Filed: Aug. 23, 2021

(65) Prior Publication Data

US 2021/0382644 A1 Dec. 9, 2021

Related U.S. Application Data

(63) Continuation of application No. 16/803,449, filed on Feb. 27, 2020, now Pat. No. 11,099,759, which is a continuation of application No. PCT/CN2020/071599, filed on Jan. 11, 2020.

(30) Foreign Application Priority Data

Jun. 3, 2019 (CN) .......................... 201910475974.8

(51) Int. Cl.
*G06F 3/06* (2006.01)
*H04L 9/06* (2006.01)
(52) U.S. Cl.
CPC ............ *G06F 3/0644* (2013.01); *G06F 3/067* (2013.01); *G06F 3/0614* (2013.01); *G06F 3/0653* (2013.01); *G06F 3/0659* (2013.01); *H04L 9/0637* (2013.01)

(58) Field of Classification Search
CPC ...... G06F 3/0644; G06F 3/0653; G06F 3/067; H04L 9/0637
See application file for complete search history.

(56) References Cited

U.S. PATENT DOCUMENTS 8,171,228 B2 5/2012 Midda
9,262,095 B2 2/2016 Sugimoto
9,262,096 B2 2/2016 Park
(Continued)

FOREIGN PATENT DOCUMENTS

CN 102882969 1/2013
CN 103076993 5/2013
(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.
(Continued)

*Primary Examiner* — David Yl
*Assistant Examiner* — Nicholas A. Paperno
(74) *Attorney, Agent, or Firm* — Fish & Richardson P.C.

(57) ABSTRACT

Storage devices are divided into subgroups and assigned to subsystems based on data input and data output frequencies of the subsystems. Each subgroup of storage devices is associated with a corresponding subsystem. A subsystem with higher data input and data output frequencies is assigned a higher number of solid state drives than a subsystem with lower data input and data output frequencies.

15 Claims, 4 Drawing Sheets

(56) References Cited

U.S. PATENT DOCUMENTS

| | | | |
|---|---|---|---|
| 11,099,759 | B2 | 8/2021 | Yang |
| 2012/0005376 | A1 | 1/2012 | Meghdies Vardeh et al. |
| 2014/0324920 | A1 | 10/2014 | Hamilton |
| 2016/0231928 | A1 | 8/2016 | Lewis et al. |
| 2016/0306678 | A1 | 10/2016 | Hira et al. |
| 2018/0217784 | A1 | 8/2018 | Aronovich et al. |
| 2019/0213046 | A1 | 7/2019 | Matas |
| 2020/0073758 | A1 | 3/2020 | Natarajan et al. |
| 2020/0201554 | A1 | 6/2020 | Yang |

FOREIGN PATENT DOCUMENTS

| | | |
|---|---|---|
| CN | 103095805 | 5/2013 |
| CN | 103713861 | 4/2014 |
| CN | 204595827 | 8/2015 |
| CN | 106055277 | 10/2016 |
| CN | 106612280 | 5/2017 |
| CN | 108519862 | 9/2018 |
| CN | 109388341 | 2/2019 |
| CN | 109522362 | 3/2019 |
| CN | 110347497 | 10/2019 |

OTHER PUBLICATIONS

International Search Report and Written Opinion in PCT Appln. No. PCT/CN2020/071599, dated Apr. 13, 2020, 9 pages (full machine translation).

Nakamoto, "Bitcoin: A Peer-to-Peer Electronic Cash System," www.bitcoin.org, 2005, 9 pages.

Wu, "Discussion on Solid State Disk as Data Storage Device in the Storage System of Production and Broadcasting Network," Information Technology and Informatization. Aug. 2014. (7):115-116 (with machine translation).

METHOD AND DEVICE FOR DIVIDING STORAGE DEVICES INTO DEVICE GROUPS

CROSS-REFERENCE TO RELATED APPLICATIONS

This application is a continuation of U.S. patent application Ser. No. 16/803,449, now allowed, filed on Feb. 27, 2020, which is a continuation of PCT Application No. PCT/CN2020/071599, filed on Jan. 11, 2020, which claims priority to Chinese Patent Application No. 201910475974.8, filed on Jun. 3, 2019, and each application is hereby incorporated by reference in its entirety.

TECHNICAL FIELD

Implementations of the present specification relate to the field of information technologies, and in particular, to methods and devices for dividing a plurality of storage devices into device groups.

BACKGROUND

In a related scenario involving massive service data storage, to alleviate a performance bottleneck existing in a conventional centralized storage method, a distributed storage method is usually used to store service data. In the distributed storage method, data is distributed and stored on a plurality of storage devices, and storage load is shared by the plurality of storage devices.

Figure 1:
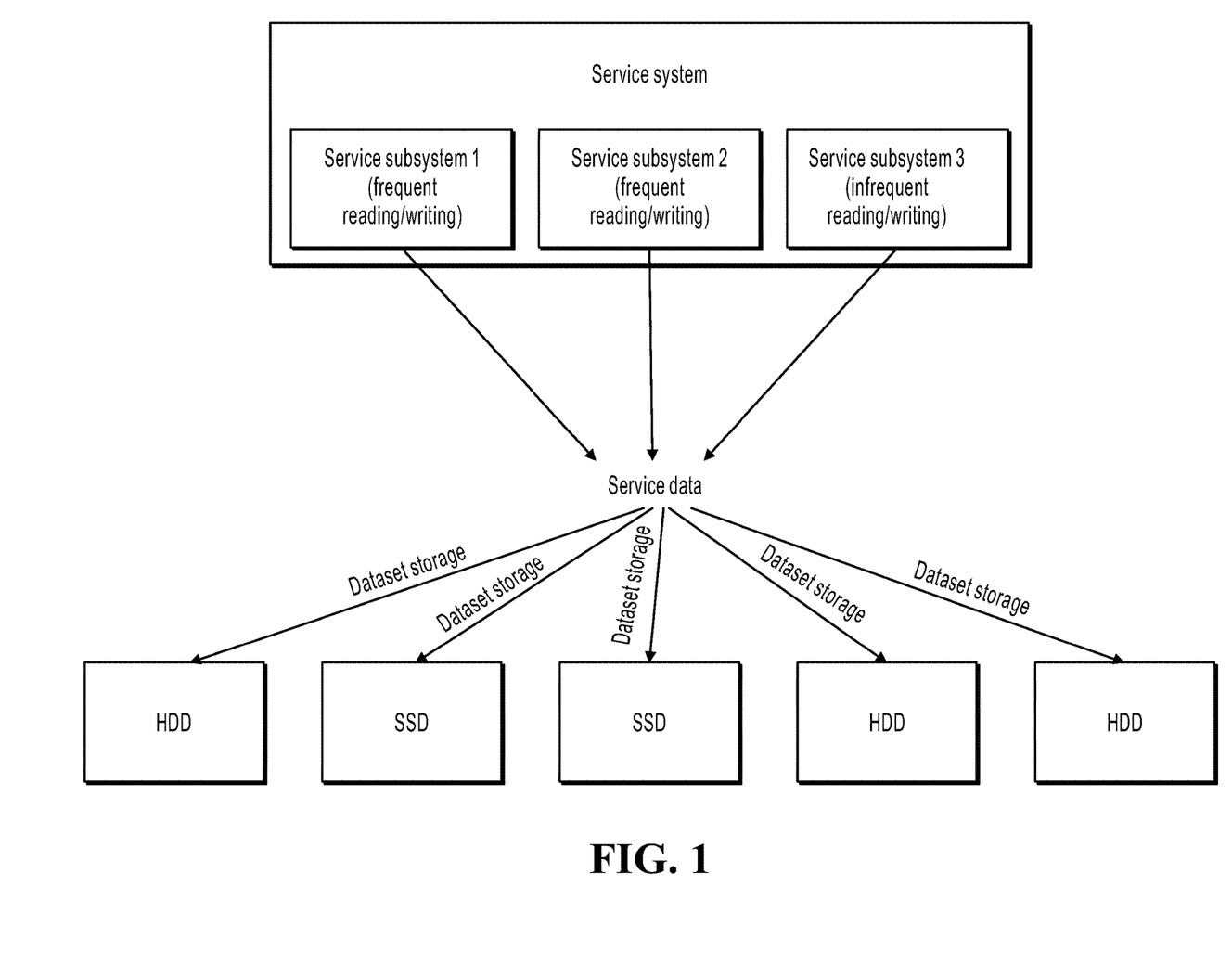
- FIG. 1 is a schematic diagram illustrating an existing service data storage method.

Specifically, as shown in FIG. 1, a service system includes a plurality of service subsystems, and a plurality of storage devices are also deployed. Service data generated by each service subsystem needs to be distributed on the plurality of storage devices for shared storage.

Among the plurality of deployed storage devices, storage mediums of some storage devices are hard disk drives (HDD), and storage mediums of some other storage devices are solid-state drives (SSD). The cost of using the HDD is relatively low, but a data read/write speed is also relatively low, whereas the cost of using the SSD is relatively high, but a data read/write speed is also relatively high.

However, for cost reasons, a quantity of storage devices whose storage mediums are SSDs is limited in the plurality of deployed storage devices.

SUMMARY

To improve performance efficiency of a storage device using an SSD as a storage medium, implementations of the present specification provide methods and devices for dividing a plurality of storage devices into device groups. Technical solutions are as follows:

According to a first aspect of the implementations of the present specification, a method for dividing a plurality of storage devices into device groups is provided, where a plurality of storage devices for performing distributed storage on service data generated by a service system are deployed in advance, the service system includes N service subsystems, and N>1; and the method includes the following: analyzing a frequency of performing a data read/write operation by each service subsystem; and dividing the plurality of storage devices into N device groups including at least one storage device based on the frequency of performing a data read/write operation by the service subsystem, and establishing a one-to-one correspondence between the N service subsystems and the N device groups, so that service data generated by each service subsystem is stored on a device group corresponding to the service subsystem, where a service subsystem performing a data read/write operation more frequently corresponds to a larger quantity of target devices, and a quantity of target devices corresponding to any service subsystem is a quantity of storage devices using SSDs as storage mediums in a device group corresponding to the service subsystem.

According to a second aspect of the implementations of the present specification, a device for dividing a plurality of storage devices into device groups is provided, where a plurality of storage devices for performing distributed storage on service data generated by a service system are deployed in advance, the service system includes N service subsystems, and N>1; and the device includes the following: an analysis module, configured to analyze a frequency of performing a data read/write operation by each service subsystem; and a division module, configured to divide the plurality of storage devices into N device groups including at least one storage device based on the frequency of performing a data read/write operation by the service subsystem, and establish a one-to-one correspondence between the N service subsystems and the N device groups, so that service data generated by each service subsystem is stored on a device group corresponding to the service subsystem, where a service subsystem performing a data read/write operation more frequently corresponds to a larger quantity of target devices, and a quantity of target devices corresponding to any service subsystem is a quantity of storage devices using SSDs as storage mediums in a device group corresponding to the service subsystem.

According to the technical solutions provided in the implementations of the present specification, a dedicated device group (including at least one storage device) is allocated to each service subsystem in a service system, and a quantity of storage devices using SSDs as storage mediums in a device group corresponding to each service subsystem is determined based on a frequency of performing a data read/write operation by the service subsystem. A service subsystem performing a data read/write operation more frequently corresponds to a larger quantity of target devices, and a quantity of target devices corresponding to any service subsystem is a quantity of storage devices using SSDs as storage mediums in a device group corresponding to the service subsystem.

According to the implementations of the present specification, a limited quantity of SSD storage devices are properly allocated, and a larger quantity of SSDs storage devices are allocated to a service subsystem performing a data read/write operation more frequently. As such, performance efficiency of limited SSD storage devices can be improved.

It should be understood that the previous general description and the following detailed description are merely exemplary and illustrative, and cannot limit the implementations of the present specification.

In addition, any one of the implementations of the present specification does not need to achieve each of the previous effects.

BRIEF DESCRIPTION OF DRAWINGS

To describe the technical solutions in the implementations of the present specification or in the existing technology more clearly, the following briefly describes the accompanying drawings required for describing the implementations or the existing technology. Clearly, the accompanying drawings in the following description merely show some imple

DESCRIPTION OF IMPLEMENTATIONS

For convenience of description, in the present specification, a storage device using an SSD as a storage medium is referred to as an SSD storage device, and a storage device using an HDD as a storage medium is referred to as an HDD storage device.

In practice, different service subsystems in a service system are usually responsible for different service parts to implement different service functions. For some service functions, a service subsystem responsible for the service function needs to frequently perform data read/write operations. For some service functions, the frequency of performing a data read/write operation by a service subsystem responsible for the service function is low.

In existing technologies, as shown in FIG. 1, a plurality of deployed storage devices provide data storage services for each service subsystem, and service data generated by each service subsystem is stored on the plurality of storage devices in the form of datasets. For a service subsystem (e.g., service subsystem 3 in FIG. 1) that does not frequently perform a data read/write operation, service data generated by the service subsystem is also stored on each SSD storage device in the form of datasets. However, because this part of service data is less related to data read/write (e.g., data modification and data reading), storage space of an SSD occupied by this part of service data is actually wasted (an advantage of a high read/write speed of the SSD cannot be reaped). It can be seen that performance efficiency of the SSD in the existing service data storage method is low.

Therefore, to improve performance utilization of an SSD, as many SSDs as possible need to be used in frequent data read/write scenarios. Therefore, the main purpose of the present disclosure is to no longer enable a plurality of storage devices to provide a data storage service for each service subsystem without distinction, but to divide the plurality of storage devices, so that different device groups are allocated to different service subsystems. The more frequent a service subsystem performs a data read/write operation, the more SSD storage devices are included in a device group allocated to the service subsystem. As such, performance of the SSD can be optimized to reduce idleness of the SSD.

Figure 2:
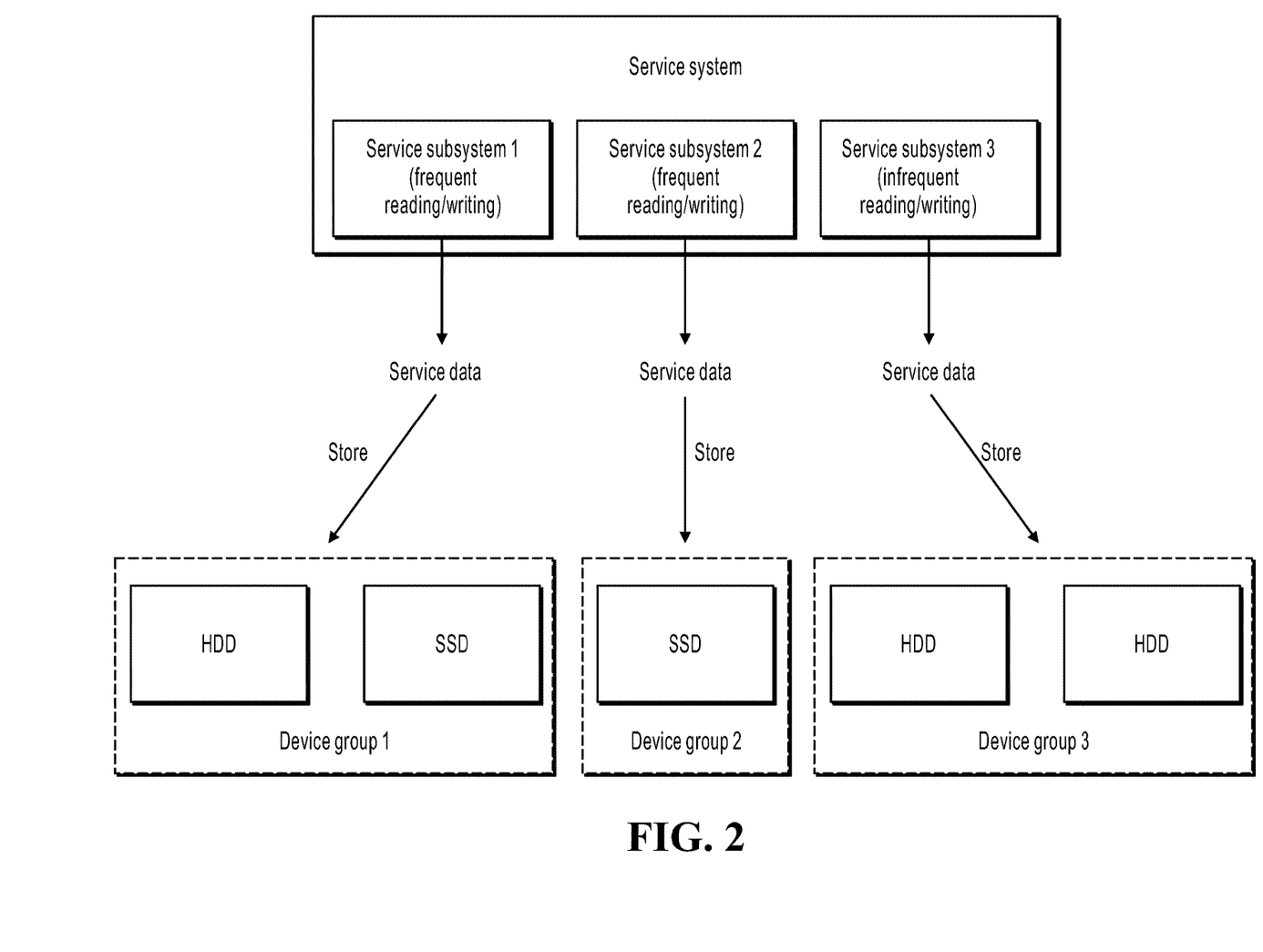
FIG. 2 is a schematic diagram illustrating a service data storage method, according to some implementations of the present specification.

FIG. 2 is a schematic diagram illustrating a service data storage method, according to some implementations of the present specification. As shown in FIG. 2, a plurality of deployed storage devices are divided, and service subsystem 1 performs a data read/write operation relatively frequently and generates a relatively large amount of data. Therefore, a device group corresponding to service subsystem 1 includes an HDD storage device and an SSD storage device. Specifically, service data generated by service subsystem 1 can be directly stored on the SSD storage device in device group 1, so as to improve a data storage speed. Subsequently, as service data generated by service subsystem 1 increases, the service data stored on the SSD storage device in device group 1 can be transferred to the HDD storage device in device group 1 for storage.

Service subsystem 2 is similar to service subsystem 1. Therefore, a device group corresponding to service subsystem 2 includes one SSD storage device. Service subsystem 3 infrequently performs a data read/write operation. Therefore, a device group corresponding to service subsystem 3 may not include an SSD storage device.

In addition, it is worthwhile to further note that the "data read/write operation" in the present specification refers to at least one of data writing and data reading. The data writing operation further includes a data storage operation, a data update operation, or a data deletion operation.

To make a person skilled in the art understand the technical solutions in the implementations of the present specification better, the following describes in detail the technical solutions in the implementations of the present specification with reference to the accompanying drawings in the implementations of the present specification. Clearly, the described implementations are merely some but not all of the implementations of the present specification. Other implementations obtained by a person of ordinary skill in the art based on the implementations of the present specification shall fall within the protection scope.

The technical solutions provided in the implementations of the present specification are described in detail below with reference to the accompanying drawings.

Figure 3:
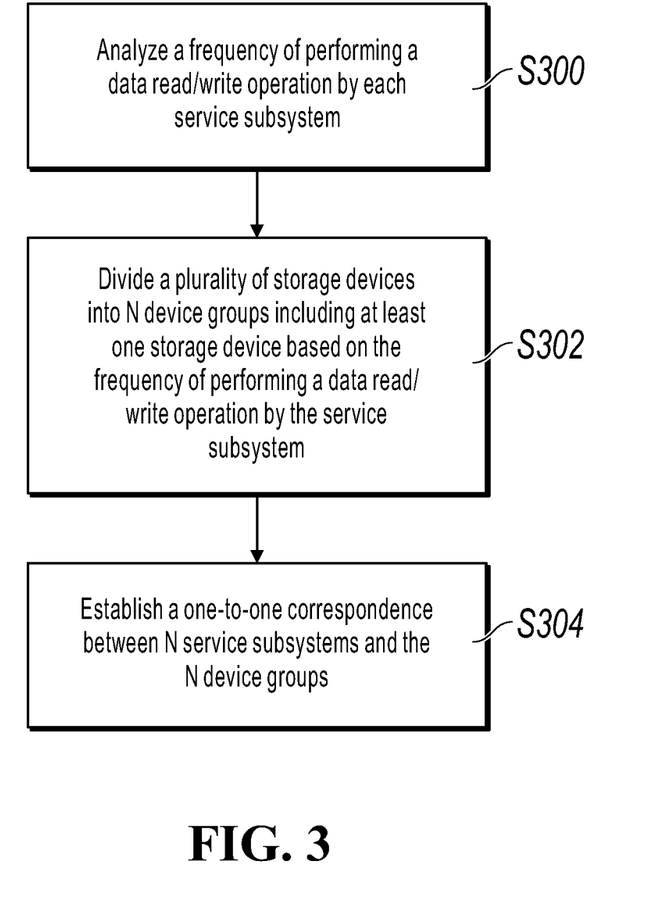
FIG. 3 is a schematic flowchart illustrating a method for dividing a plurality of storage devices into device groups, according to some implementations of the present specification.

FIG. 3 is a schematic flowchart illustrating a method for dividing a plurality of storage devices into device groups, according to some implementations of the present specification. The method includes the following steps.

S300: Analyze a frequency of performing a data read/write operation by each service subsystem.

In some implementations of the present specification, a plurality of storage devices for performing distributed storage on service data generated by a service system are deployed in advance. In the present specification, for convenience of description, assume that the service system includes N service subsystems, and N>1.

The method can be performed by the service system, or can be performed by a service management system responsible for managing the service system.

In some implementations of the present specification, the more frequently a service subsystem performs a data read/write operation, the more frequently the service subsystem needs to perform data storage, data updating, or data read/write for a storage device. SSD storage devices need to be allocated to a service subsystem that performs a data read/write operation relatively frequently as many as possible, so as to optimize the high-speed read/write performance of an SSD.

In some implementations of the present specification, a frequency of performing a data read/write operation by each service subsystem can be analyzed in a plurality of ways.

For example, a quantity of times each service subsystem performs a data read/write operation within a specified time period can be counted, to indicate the frequency of performing a data read/write operation by the service subsystem, where the counted quantity of times is positively correlated with the frequency of performing a data read/write operation by the service subsystem.

For another example, quantities of times each service subsystem performs a data read/write operation in a plurality of consecutive specified time intervals can be counted, and then an average value of the counted quantities of times in the plurality of specified time intervals is calculated, to indicate the frequency of performing a data read/write operation by the service subsystem. The calculated average value is positively correlated with the frequency of performing a data read/write operation by the service subsystem.

S302: Divide the plurality of storage devices into N device groups including at least one storage device based on the frequency of performing a data read/write operation by the service subsystem.

The main purpose of the implementations of the present specification is to allocate a relatively large quantity of SSD storage devices to a service subsystem performing a data read/write operation relatively frequently, and allocate a relatively small quantity of SSD storage devices (or allocate no SSD storage device) to a service subsystem performing a data read/write operation relatively infrequently.

Therefore, a rule that needs to be followed in the method for dividing the plurality of storage devices into N device groups that are in a one-to-one correspondence with the N service subsystems is as follows: A service subsystem performing a data read/write operation more frequently corresponds to a larger quantity of target devices, and a quantity of target devices corresponding to any service subsystem is a quantity of SSD storage devices in a device group corresponding to the service subsystem.

It is worthwhile to note that, in some implementations of the present specification, a quantity of HDD storage devices in each device group can be flexibly determined. For example, if an amount of service data generated by a service subsystem is relatively large, more HDD storage devices can be allocated to a device group corresponding to the service subsystem. In addition, if the service subsystem performs a data storage operation relatively frequently, only an SSD storage device in the device group corresponding to the service subsystem can be responsible for storing newly generated service data, and service data that has been stored on the SSD storage device for a relatively long time can be subsequently transferred to an HDD storage device in the same group for storage, so as to free up valuable SSD space for high-speed writing of newly generated service data.

S304: Establish a one-to-one correspondence between the N service subsystems and the N device groups.

Through step S304, service data generated by each service subsystem can be stored on a device group corresponding to the service subsystem.

According to the technical solutions provided in some implementations of the present specification, a dedicated device group (including at least one storage device) is allocated to each service subsystem in a service system, and a quantity of storage devices using SSDs as storage mediums in a device group corresponding to each service subsystem is determined based on a frequency of performing a data read/write operation by the service subsystem. A service subsystem performing a data read/write operation more frequently corresponds to a larger quantity of target devices, and a quantity of target devices corresponding to any service subsystem is a quantity of storage devices using SSDs as storage mediums in a device group corresponding to the service subsystem.

According to some implementations of the present specification, a limited quantity of SSD storage devices are properly allocated, and a larger quantity of SSDs storage devices are allocated to a service subsystem performing a data read/write operation more frequently. As such, performance efficiency of limited SSD storage devices can be improved.

In addition, in some implementations of the present specification, the service system can be specifically a blockchain service system, and the service system includes a first service subsystem configured to write service data into a blockchain and a second service subsystem configured to read service data that has been in a blockchain for more than specified duration after being written.

Blockchain data has a time order. Generally, frequent data read/write operations are involved for newly generated blockchain data, but no data writing operation is involved and a data reading operation is infrequent for blockchain data that has been stored for a period of time (duration for which the blockchain data has been stored after being written is greater than specified duration). Therefore, in terms of a division policy, each storage device in a device group corresponding to the first service subsystem can use an SSD as a storage medium, and each storage device in a device group corresponding to the second service subsystem can use an HDD as a storage medium.

In addition, in the implementations of the present specification, when a predetermined re-division condition is satisfied, a frequency of performing a data read/write operation by each service subsystem can be re-analyzed. In other words, when the predetermined re-division condition is satisfied, a plurality of storage devices are re-divided based on the method shown in FIG. 3.

For example, in practice, the frequency of performing a data read/write operation by each service subsystem may change. Therefore, re-division can be periodically performed to re-analyze a frequency of performing a data read/write operation by each service subsystem. In this case, the re-division condition can be a specified period elapses.

For another example, in practice, a function of any service subsystem may change, and even a function of each service subsystem changes. In this case, the re-division condition can be that a function of at least one service subsystem is updated.

Figure 4:
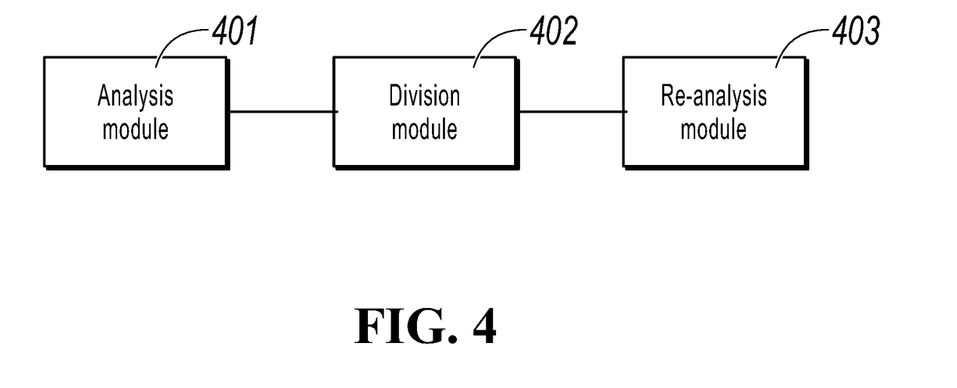
FIG. 4 is a schematic flowchart illustrating a device for dividing a plurality of storage devices into device groups, according to some implementations of the present specification.

FIG. 4 is a schematic structural diagram illustrating a device for dividing a plurality of storage devices into device groups, according to some implementations of the present specification. A plurality of storage devices for performing distributed storage on service data generated by a service system are deployed in advance, the service system includes N service subsystems, and N>1.

The device includes the following: an analysis module 401, configured to analyze a frequency of performing a data read/write operation by each service subsystem; and a division module 402, configured to divide the plurality of storage devices into N device groups including at least one storage device based on the frequency of performing a data read/write operation by the service subsystem, and establish a one-to-one correspondence between the N service subsystems and the N device groups, so that service data generated by each service subsystem is stored on a device group corresponding to the service subsystem, where a service subsystem performing a data read/write operation more frequently corresponds to a larger quantity of target devices, and a quantity of target devices corresponding to any service subsystem is a quantity of storage devices using SSDs as storage mediums in a device group corresponding to the service subsystem.

The analysis module 401 counts a quantity of times each service subsystem performs a data read/write operation within a specified time period, to indicate the frequency of performing a data read/write operation by the service subsystem, where the counted quantity of times is positively correlated with the frequency of performing a data read/write operation by the service subsystem.

The device further includes the following: a re-analysis module 403, configured to: when a predetermined re-division condition is satisfied, re-analyze a frequency of performing a data read/write operation by each service subsystem.

The re-division condition specifically includes the following: a function of at least one service subsystem is updated.

The service system is a blockchain service system, and the service system includes a first service subsystem configured to write service data into a blockchain and a second service subsystem configured to read service data that has been in a blockchain for more than specified duration after being written; and each storage device in a device group corresponding to the first service subsystem uses an SSD as a storage medium, and each storage device in a device group corresponding to the second service subsystem uses an HDD as a storage medium.

Some implementations of the present specification further provide a computer device. The computer device includes at least a memory, a processor, and a computer program that is stored in the memory and can run on the processor, and the processor implements the method shown in FIG. 3 when executing the program.

Figure 5:
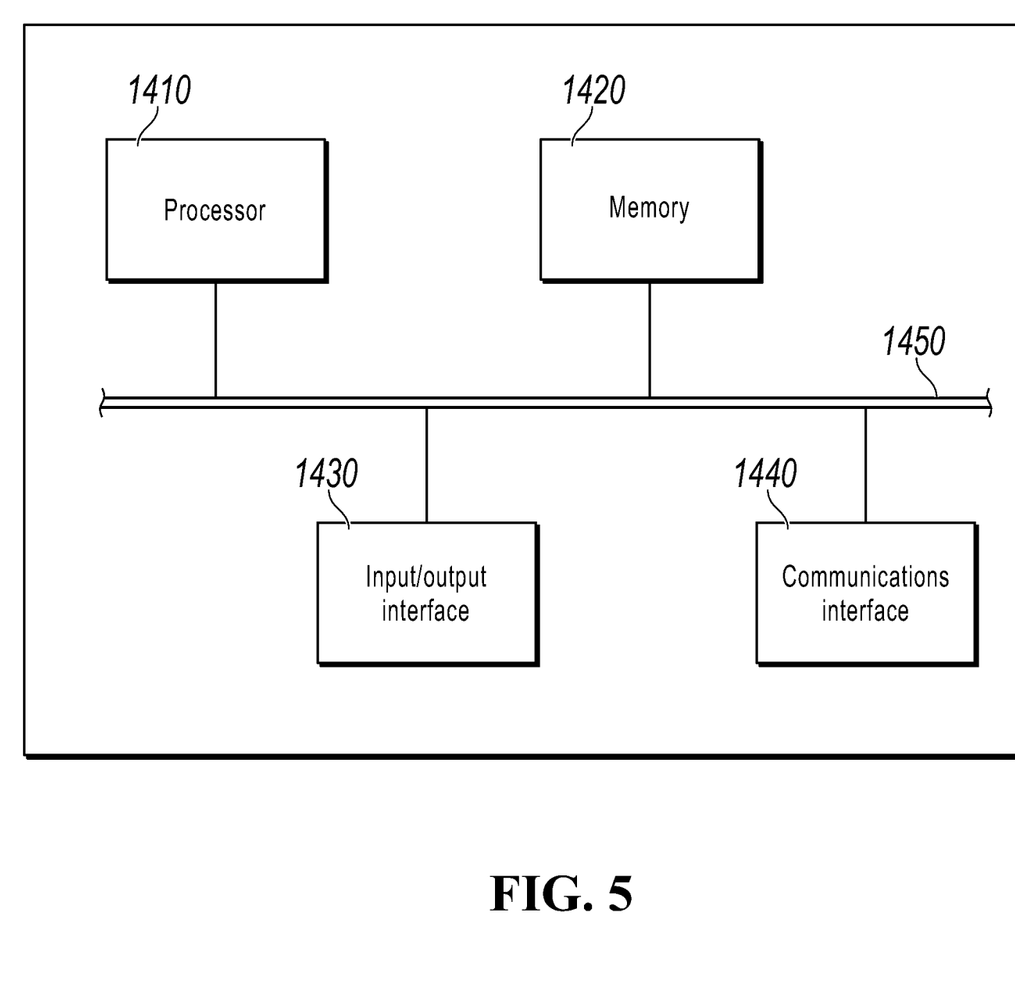
FIG. 5 is a schematic structural diagram illustrating a computer device for configuring the device in the implementations of the present specification.

FIG. 5 is a more detailed schematic diagram illustrating a hardware structure of a computing device, according to some implementations of the present specification. The device can include a processor 1410, a memory 1420, an input/output interface 1430, a communications interface 1440, and a bus 1450. The processor 1410, the memory 1420, the input/output interface 1430, and the communications interface 1440 are communicatively connected to each other inside the device by using the bus 1450.

The processor 1410 can be implemented by using a general central processing unit (CPU), a microprocessor, an application-specific integrated circuit (ASIC), one or more integrated circuits, etc., and is configured to execute a related program, so as to implement the technical solutions provided in the implementations of the present specification.

The memory 1420 can be implemented by using a read-only memory (ROM), a random access memory (RAM), a static storage device, a dynamic storage device, etc. The memory 1420 can store an operating system and another application program. When the technical solutions provided in the implementations of the present specification are implemented by using software or firmware, related program code is stored in the memory 1420, and is invoked and executed by the processor 1410.

The input/output interface 1430 is configured to be connected to an input/output module, to input or output information. The input/output module (not shown in the figure) can be used as a component and configured in the device, or can be externally connected to the device, to provide a corresponding function. The input device can include a keyboard, a mouse cursor, a touchscreen, a microphone, various sensors, etc. The output device can include a monitor, a speaker, an oscillator, an indicator, etc.

The communications interface 1440 is configured to be connected to a communications module (not shown in the figure), to implement communication interaction between the device and another device. The communications module can perform wired communication (e.g., through a USB or a network cable), or can perform communication wirelessly (e.g., through a mobile network, Wi-Fi, or Bluetooth).

The bus 1450 includes a channel, used to transmit information between components (e.g., the processor 1410, the memory 1420, the input/output interface 1430, and the communications interface 1440) of the device.

It is worthwhile to note that although only the processor 1410, the memory 1420, the input/output interface 1430, the communications interface 1440, and the bus 1450 of the device are shown, during implementation, the device can further include other components required for implementing normal running. In addition, a person skilled in the art can understand that the device can include only components necessary for implementing the solutions in the implementations of the present specification, but does not necessarily include each component shown in the figure.

Some implementations of the present specification further provide a computer-readable storage medium. The computer-readable storage medium stores a computer program, and the program is executed by a processor to implement functions of the method shown in FIG. 3.

The computer-readable medium includes persistent, non-persistent, movable, and unmovable media that can store information by using any method or technology. The information can be a computer readable instruction, a data structure, a program module, or other data. Examples of the computer storage medium include but are not limited to a phase change RAM (PRAM), a static RAM (SRAM), a dynamic RAM (DRAM), a RAM of another type, a ROM, an electrically erasable programmable read only memory (EEPROM), a flash memory or another memory technology, a compact disc read-only memory (CD-ROM), a digital versatile disc (DVD), or another optical storage, a cassette, a cassette magnetic disk storage, or another magnetic storage device or any other non-transmission medium. The computer storage medium can be configured to store information that can be accessed by a computing device. As described in the present specification, the computer readable medium does not include computer readable transitory media such as a modulated data signal and a carrier.

It can be seen from the previous descriptions of the implementations that, a person skilled in the art can clearly understand that the implementations of the present specification can be implemented by using software and a necessary general hardware platform. Based on such an understanding, the technical solutions in the implementations of the present specification essentially or the part contributing to the existing technology can be implemented in a form of a software product. The computer software product can be stored in a storage medium, such as a ROM/RAM, a magnetic disk, or an optical disc, and includes several instructions for instructing a computer device (which can be a personal computer, a server, a network device, etc.) to perform the method described in the implementations of the present specification or in some parts of the implementations of the present specification.

The system, method, module, or unit illustrated in the previous implementations can be specifically implemented by using a computer chip or an entity, or can be implemented by using a product having a certain function. A typical implementation device is a computer, and the computer can be specifically a personal computer, a laptop computer, a cellular phone, a camera phone, a smartphone, a personal digital assistant, a media player, a navigation device, an email receiving and sending device, a game console, a tablet computer, a wearable device, or any combination of these devices.

The implementations of the present specification are described in a progressive way. For same or similar parts of the implementations, references can be made to the implementations. Each implementation focuses on a difference from other implementations. Particularly, apparatus implementations are similar to method implementations, and therefore are described briefly. For a related part, references can be made to some descriptions in the method implementation. The previously described method implementations are merely examples. The modules described as separate parts can or cannot be physically separate. During implementation of the solutions in the implementations of the present specification, functions of the modules can be implemented in one or more pieces of software and/or hardware. Some or all of the modules can be selected based on an actual need to implement the solutions of the implementations. A person of ordinary skill in the art can understand and implement the implementations of the present specification without creative efforts.

The previous descriptions are merely specific implementations of the implementations of the present specification. It is worthwhile to note that a person of ordinary skill in the art can further make several improvements or polishing without departing from the principle of the implementations of the present specification, and the improvements or polishing shall fall within the protection scope of the implementations of the present specification.

What is claimed is:

1. A computer-implemented method for distributed data storage, the method comprising:
   for a blockchain service system comprising N subsystems, wherein N is a positive number greater than 1, wherein a first subsystem of the N subsystems has a function of writing data to a blockchain, and wherein a second subsystem of the N subsystems has a function of reading data that has been stored in the blockchain for at least a predetermined period of time,
   determining that the first subsystem has changed to a function different from the function of writing data to the blockchain, or that the second subsystem has changed to a function different from the function of reading data that has been stored in the blockchain for at least the predetermined period of time; and
   in response to determining that the first subsystem or the second subsystem has changed to a different function, performing a re-division of the N subsystems of the blockchain service system, wherein performing the re-division comprises:
      determining data input and output frequency of each of the N subsystems of the blockchain service system, including based on data input and output since a previous re-division,
      dividing a plurality of storage devices into N subgroups, wherein each subgroup includes at least one of the plurality of storage devices, and wherein each of the plurality of storage devices is included in no more than one subgroup of the N subgroups, and
      establishing a one-to-one correspondence between the N subsystems and the N subgroups, wherein a subsystem with higher determined data input and output frequency corresponds to a subgroup that includes a number of solid state drives that are greater than or equal to a number of solid state drives included in a subgroup corresponding to a subsystem with lower determined data input and output frequency, and
      wherein, while the first subsystem has the function of writing data to the blockchain, a subgroup corresponding to the first subsystem consists of solid state drives.

2. The computer-implemented method of claim 1, wherein the data input and output frequency is determined by counting a quantity of times a data recording or data retrieving operation is performed by a corresponding subsystem of the N subsystems within a second predetermined period of time, the second predetermined period of time including a time interval since the previous re-division.

3. The computer-implemented method of claim 1, wherein determining the data input and output frequency of each of the N subsystems of the blockchain service system comprises:
   counting, as a counted quantities of times, a quantity of times a third subsystem of the N subsystems performs a data read or data write operation in each of a plurality of consecutive specified time intervals; and
   determining an average value of the counted quantities of times.

4. The computer-implemented method of claim 1, wherein a third subsystem of the N subsystems corresponds to a subgroup comprising a solid state drive and a hard disk drive, and wherein performing the re-division of the blockchain service system comprises:
   determining that a portion of service data is stored on the solid state drive of the third subsystem for a second predetermined period of time; and
   based on determining that the portion of service data is stored on the solid state drive of the third subsystem for the second predetermined period of time, transferring the portion of service data to the hard disk drive of the third subsystem.

5. The computer-implemented method of claim 1, comprising:
   determining that an amount of service data generated by a third subsystem of the N subsystems is large compared to amounts of service data generated by other subsystems of the N subsystems; and
   based on determining that the amount of service data generated by the third subsystem is large, assigning an additional hard disk drive to a subgroup corresponding to the third subsystem.

6. A computer-implemented system for distributed data storage, comprising:
   one or more computers; and
   one or more computer memory devices interoperably coupled with the one or more computers and having tangible, non-transitory, machine-readable media storing one or more instructions that, when executed by the one or more computers, cause the one or more computers to perform operations comprising:
   for a blockchain service system comprising N subsystems, wherein N is a positive number greater than 1, wherein a first subsystem of the N subsystems has a function of writing data to a blockchain, and wherein a second subsystem of the N subsystems has a function of reading data that has been stored in the blockchain for at least a predetermined period of time,
   determining that the first subsystem has changed to a function different from the function of writing data to the blockchain, or that the second subsystem has changed to a function different from the function of reading data that has been stored in the blockchain for at least the predetermined period of time; and in response to determining that the first subsystem or the second subsystem has changed to a different function, performing a re-division of the N subsystems of the blockchain service system, wherein performing the re-division comprises:

determining data input and output frequency of each of the N subsystems of the blockchain service system, including based on data input and output since a previous re-division, dividing a plurality of storage devices into N subgroups, wherein each subgroup includes at least one of the plurality of storage devices, and wherein each of the plurality of storage devices is included in no more than one subgroup of the N subgroups, and establishing a one-to-one correspondence between the N subsystems and the N subgroups, wherein a subsystem with higher determined data input and output frequency corresponds to a subgroup that includes a number of solid state drives that are greater than or equal to a number of solid state drives included in a subgroup corresponding to a subsystem with lower determined data input and output frequency, and wherein, while the first subsystem has the function of writing data to the blockchain, a subgroup corresponding to the first subsystem consists of solid state drives.

7. The computer-implemented system of claim 6, wherein the data input and output frequency is determined by counting a quantity of times a data recording or data retrieving operation is performed by a corresponding subsystem of the N subsystems within a second predetermined period of time, the second predetermined period of time including a time interval since the previous re-division.

8. The computer-implemented system of claim 6, wherein determining the data input and output frequency of each of the N subsystems of the blockchain service system comprises:

counting, as a counted quantities of times, a quantity of times a third subsystem of the N subsystems performs a data read or data write operation in each of a plurality of consecutive specified time intervals; and determining an average value of the counted quantities of times.

9. The computer-implemented system of claim 6, wherein a third subsystem of the N subsystems corresponds to a subgroup comprising a solid state drive and a hard disk drive, and wherein performing the re-division of the blockchain service system comprises:

determining that a portion of service data is stored on the solid state drive of the third subsystem for a second predetermined period of time; and based on determining that the portion of service data is stored on the solid state drive of the third subsystem for the second predetermined period of time, transferring the portion of service data to the hard disk drive of the third subsystem.

10. The computer-implemented system of claim 6, wherein the operations comprise:

determining that an amount of service data generated by a third subsystem of the N subsystems is large compared to amounts of service data generated by other subsystems of the N subsystems; and based on determining that the amount of service data generated by the third subsystem is large, assigning an additional hard disk drive to a subgroup corresponding to the third subsystem.

11. A non-transitory, computer-readable medium storing one or more instructions that, when executed by a computer system, cause the computer system to perform operations for distributed data storage, comprising:

for a blockchain service system comprising N subsystems, wherein N is a positive number greater than 1, wherein a first subsystem of the N subsystems has a function of writing data to a blockchain, and wherein a second subsystem of the N subsystems has a function of reading data that has been stored in the blockchain for at least a predetermined period of time, determining that the first subsystem has changed to a function different from the function of writing data to the blockchain, or that the second subsystem has changed to a function different from the function of reading data that has been stored in the blockchain for at least the predetermined period of time; and in response to determining that the first subsystem or the second subsystem has changed to a different function, performing a re-division of the N subsystems of the blockchain service system, wherein performing the re-division comprises:

determining data input and output frequency of each of the N subsystems of the blockchain service system, including based on data input and output since a previous re-division, dividing a plurality of storage devices into N subgroups, wherein each subgroup includes at least one of the plurality of storage devices, and wherein each of the plurality of storage devices is included in no more than one subgroup of the N subgroups, and establishing a one-to-one correspondence between the N subsystems and the N subgroups, wherein a subsystem with higher determined data input and output frequency corresponds to a subgroup that includes a number of solid state drives that are greater than or equal to a number of solid state drives included in a subgroup corresponding to a subsystem with lower determined data input and output frequency, and wherein, while the first subsystem has the function of writing data to the blockchain, a subgroup corresponding to the first subsystem consists of solid state drives.

12. The non-transitory, computer-readable medium of claim 11, wherein the data input and output frequency is determined by counting a quantity of times a data recording or data retrieving operation is performed by a corresponding subsystem of the N subsystems within a second predetermined period of time, the second predetermined period of time including a time interval since the previous re-division.

13. The non-transitory, computer-readable medium of claim 11, wherein determining the data input and output frequency of each of the N subsystems of the blockchain service system comprises:

counting, as a counted quantities of times, a quantity of times a third subsystem of the N subsystems performs a data read or data write operation in each of a plurality of consecutive specified time intervals; and determining an average value of the counted quantities of times.

14. The non-transitory, computer-readable medium of claim 11, wherein a third subsystem of the N subsystems corresponds to a subgroup comprising a solid state drive and a hard disk drive, and wherein performing the re-division of the blockchain service system comprises:
  determining that a portion of service data is stored on the solid state drive of the third subsystem for a second predetermined period of time; and
  based on determining that the portion of service data is stored on the solid state drive of the third subsystem for the second predetermined period of time, transferring the portion of service data to the hard disk drive of the third subsystem.

15. The non-transitory, computer-readable medium of claim 11, further comprising:
  determining that an amount of service data generated by a third subsystem of the N subsystems is large compared to amounts of service data generated by other subsystems of the N subsystems; and
  based on determining that the amount of service data generated by the third subsystem is large, assigning an additional hard disk drive to a subgroup corresponding to the third subsystem.

\* \* \* \* \*